US011310375B2

(12) United States Patent
Okumura et al.

(10) Patent No.: US 11,310,375 B2
(45) Date of Patent: Apr. 19, 2022

(54) IMAGE FORMING APPARATUS, IMAGE FORMING METHOD, AND NON-TRANSITORY RECORDING MEDIUM

(71) Applicant: SHARP KABUSHIKI KAISHA, Sakai (JP)

(72) Inventors: Makoto Okumura, Sakai (JP); Hiroki Munetomo, Sakai (JP); Hiroyuki Kageyama, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/856,668

(22) Filed: Apr. 23, 2020

(65) Prior Publication Data

US 2020/0344369 A1    Oct. 29, 2020

(30) Foreign Application Priority Data

Apr. 26, 2019   (JP) .............................. JP2019-086054

(51) Int. Cl.
*H04N 1/00*       (2006.01)

(52) U.S. Cl.
CPC ..... *H04N 1/00403* (2013.01); *H04N 1/00411* (2013.01); *H04N 1/00474* (2013.01); *H04N 1/00482* (2013.01); *H04N 1/004* (2013.01)

(58) Field of Classification Search
CPC ........... H04N 1/00403; H04N 1/00482; H04N 1/00474; H04N 1/00411; H04N 1/004; G03G 15/5016

USPC ....................................................... 358/1.13
See application file for complete search history.

(56) References Cited

U.S. PATENT DOCUMENTS

| | | | | |
|---|---|---|---|---|
| 2011/0265040 | A1* | 10/2011 | Shin ................... | G06F 3/0485 715/830 |
| 2014/0298434 | A1* | 10/2014 | Prchal ................. | H04L 63/0492 726/7 |
| 2016/0080295 | A1* | 3/2016 | Davies .................... | H04L 51/10 709/204 |
| 2016/0366293 | A1 | 12/2016 | Ono | |
| 2018/0322532 | A1* | 11/2018 | Lee ..................... | G06Q 30/0207 |
| 2019/0260884 | A1* | 8/2019 | Nakajima ........... | H04N 1/00474 |
| 2020/0329160 | A1* | 10/2020 | Kuroiwa ................. | G10L 15/22 |

FOREIGN PATENT DOCUMENTS

| | | |
|---|---|---|
| JP | 2017-005475 A | 1/2017 |
| JP | 2018-157241 A | 10/2018 |

\* cited by examiner

*Primary Examiner* — Marcus T Riley
*Assistant Examiner* — Darryl V Dottin
(74) *Attorney, Agent, or Firm* — ScienBiziP, P.C.

(57) ABSTRACT

In an image forming apparatus including a controller, a display, and an image former, and being capable of executing a processing function by a voice operation, the controller performs controls to display, on the display, a voice operation screen including a command in response to a command to start an operation through a voice operation of a user, and execute a job in the image former in response to a command to execute the job being input by voice through a voice operation.

10 Claims, 21 Drawing Sheets

FIG. 7

| MFP ID | NAME | IP ADDRESS | CAPABILITY INFORMATION | STATUS |
|---|---|---|---|---|
| 0000-1111 | OFFICE MACHINE NO. 1 | 192.168.0.11 | A3, COLOR, DUPLEX, WITH FINISHER | READY FOR PRINT |
| 0000-2222 | OFFICE MACHINE NO. 2 | 192.168.0.12 | A4, MONOCHROME, SIMPLEX, NO FINISHER | OUT OF PAPER |
| 0055-5001 | OFFICE MACHINE NO. 3 | 192.168.1.113 | A3, COLOR, SIMPLEX, NO FINISHER | COMMUNICATION NA |

FIG. 20

| MFP ID | NAME | IP ADDRESS | CAPABILITY INFORMATION | STATUS |
|---|---|---|---|---|
| 0000-1111 | OFFICE MACHINE NO. 1 | 192.168.0.11 | A3, COLOR, DUPLEX, WITH FINISHER | READY FOR PRINT |

IMAGE FORMING APPARATUS, IMAGE FORMING METHOD, AND NON-TRANSITORY RECORDING MEDIUM

BACKGROUND OF THE INVENTION

Field of the Invention

The present invention relates to an image forming apparatus and the like. The present application claims the benefit of priority to Japanese Patent Application No. 2019-86054 filed in Japan on Apr. 26, 2019, and by referring to this patent application, the entire contents thereof are included in the present application.

Description of the Background Art

In conventional image forming apparatuses, there are a large number of setting items even for a normal copy operation to satisfy a user's request. Therefore, there is a problem that it is difficult for a user unfamiliar with the operation to understand the operation method, resulting in an operation error or taking a long time for the operation.

To solve this problem, as a conventional technique there is disclosed an apparatus including functions such as "Quick Setting" described in Japanese Unexamined Patent Application Publication No. 2018-157241 (hereinafter, referred to as Patent Document 1) and "Quick Copy" described in Japanese Unexamined Patent Application Publication No. 2017-5475 (hereinafter, referred to as Patent Document 2) to allow a user to easily issue basic operation instructions.

The functions such as the "Quick Setting" and the "Quick Copy," aim at simplification of user's operations by preparing and displaying, as options, a plurality of sets of combinations of frequently used setting items and setting values, or by narrowing down setting items.

On the other hand, some of recent image forming apparatuses are known in which a voice inputter is provided so that settings and processing of a job are performed in accordance with an instruction by user's voice through a dialogue between the user and the apparatuses, allowing the user to execute a job without manual operations.

However, a simple operation performed by a voice instruction is not easy even with the functions such as the "Quick Setting" and the "Quick Copy" according to the above-described conventional technique.

According to the technique disclosed in Patent Document 1, for example, in a case of the "Quick Setting", there is a problem in that if three options obtained by combining copy attribute values are displayed, it is not easy to determine how to "utter" and give an instruction.

For example, a user may read out a displayed text and give a voice instruction to the apparatus. However, there is a problem in that if the content of the instruction is large (the text is long), the voice instruction is complicated, and thus, the operation is rather troublesome.

In addition, for example, there is a problem in that if the text is long, for example, "the magnification is 100%, 3 copies, the density is low, output to tray 2, no stapling, no punching, and with sorting," the probability of failure in voice recognition increases.

According to the technique disclosed in Patent Document 2, for example, in a case of setting the "Quick Copy," there is a problem in that if the user changes setting values for density and the sheet feed tray, it is not easy to determine how to "utter" and give an instruction.

As described above, in the conventional image forming apparatus, although a screen UI to simplify an operation is disclosed in Patent Documents 1 and 2, a simple instruction by a voice operation cannot be easily performed.

The present disclosure has been made in view of the above-described conventional problems, and an object of the present disclosure is to provide an image forming apparatus and the like capable of improving user operability.

SUMMARY OF THE INVENTION

An image forming apparatus according to the present disclosure includes a controller, a display, and an image former, and executes a processing function by a voice operation. The controller performs controls to display, on the display, a voice operation screen including a command display, and execute a processing function in the image former in response to a command being input by voice through a voice operation.

A method of forming an image according to the present disclosure is a method of forming an image by an image forming apparatus including a controller, a display, and an image former, and capable of executing a processing function by a voice operation. The method includes displaying, on the display, a voice operation screen including a command display, and executing a processing function in the image former, in response to a command being input by voice through a voice operation.

A non-transitory computer-readable recording medium according to the present disclosure is a non-transitory computer-readable recording medium storing a program of an image forming apparatus including a controller, a display, and an image former, and capable of executing a processing function by a voice operation. The program causes a computer to implement displaying, on the display, a voice operation screen including a command display, and executing a processing function in the image former on the basis of a command being input by voice through a voice operation.

According to the image forming apparatus and the like of the present disclosure, it is possible to easily and certainly perform a voice operation, and thus, the user operability can be improved.

BRIEF DESCRIPTION OF THE DRAWINGS

FIG. 6 is a block diagram illustrating a configuration of an interactive server included in the image forming system;

FIG. 7 is an explanatory diagram illustrating an example of a multi-function product/printer/peripheral (MFP) capability/status information stored in a storage of the interactive server;

FIG. 20 is an explanatory diagram illustrating an example of a management table stored in a storage of the image forming apparatus.

DESCRIPTION OF THE PREFERRED EMBODIMENTS

First Embodiment

A first embodiment of the present invention will be described below with reference to the drawings.

Figure 1:
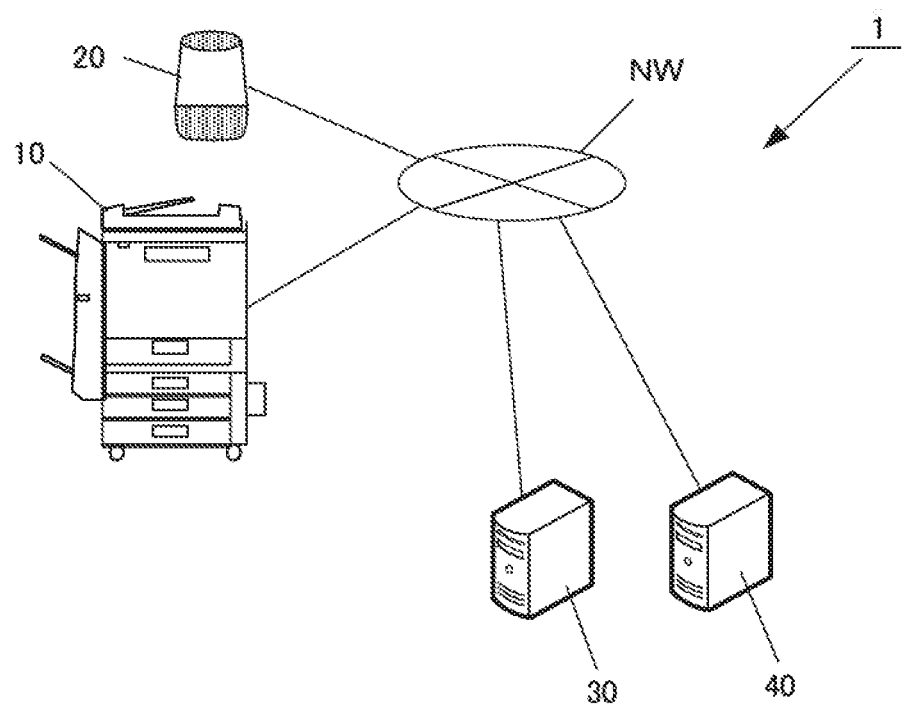
FIG. 1 is an explanatory diagram illustrating a configuration of an image forming system employing an image forming apparatus according to a first embodiment.
Figure 2:
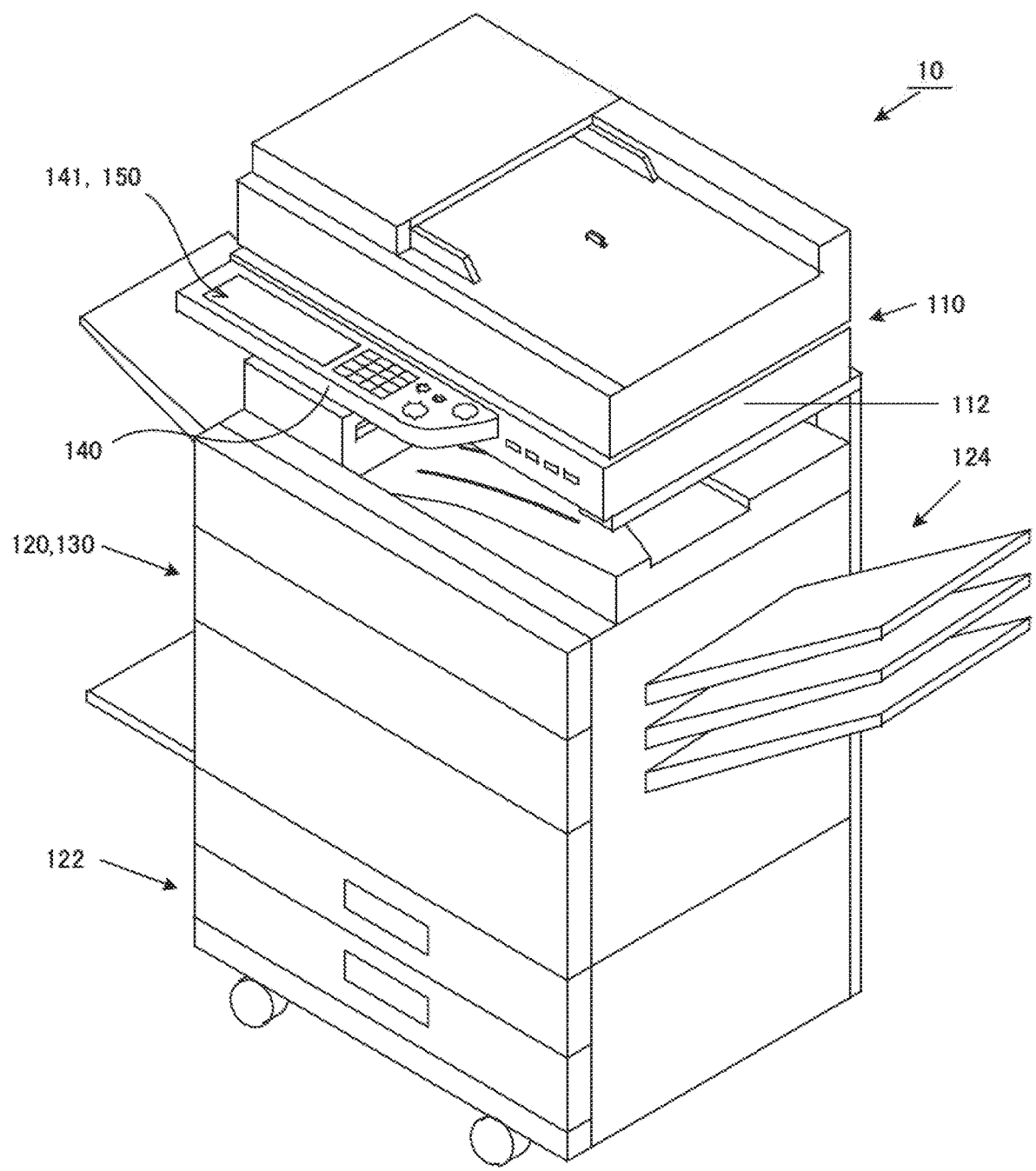
FIG. 2 is an explanatory diagram illustrating an entire configuration of the image forming apparatus.
Figure 3:
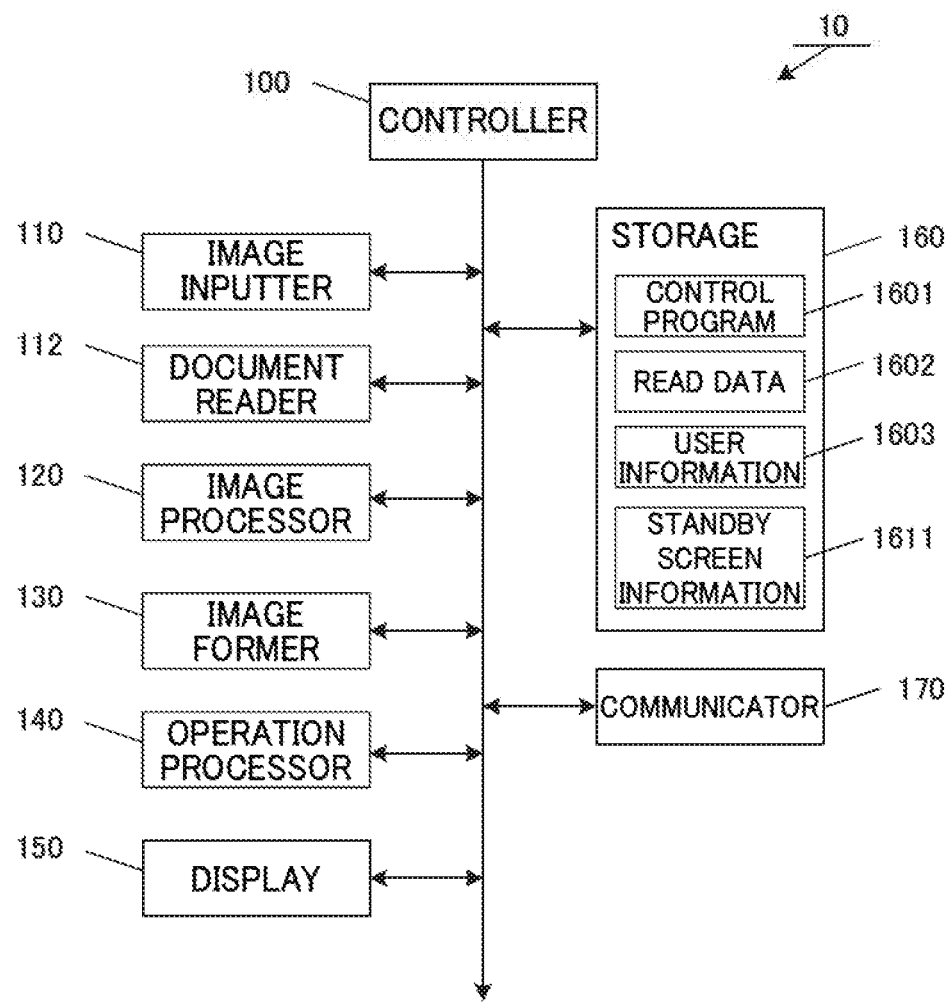
FIG. 3 is a block diagram illustrating an electrical configuration of the image forming apparatus.
Figure 4:
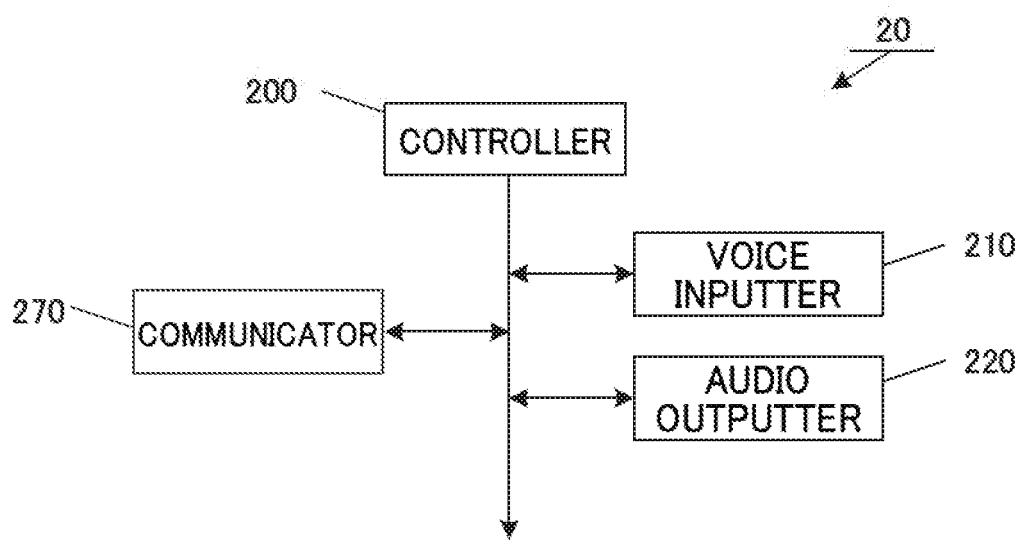
FIG. 4 is a block diagram illustrating a configuration of a voice/audio apparatus included in the image forming system.
Figure 5:
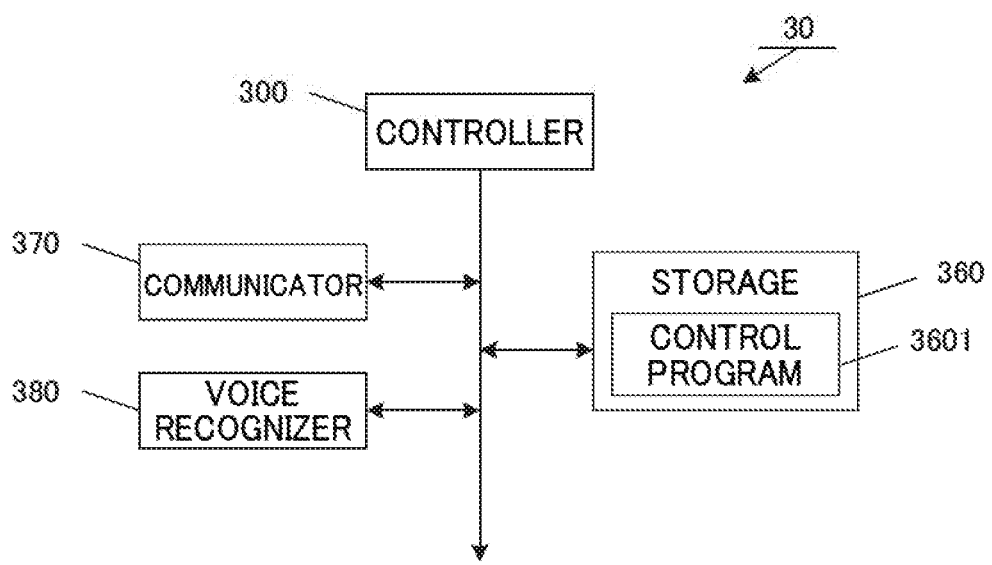
Figure 6:
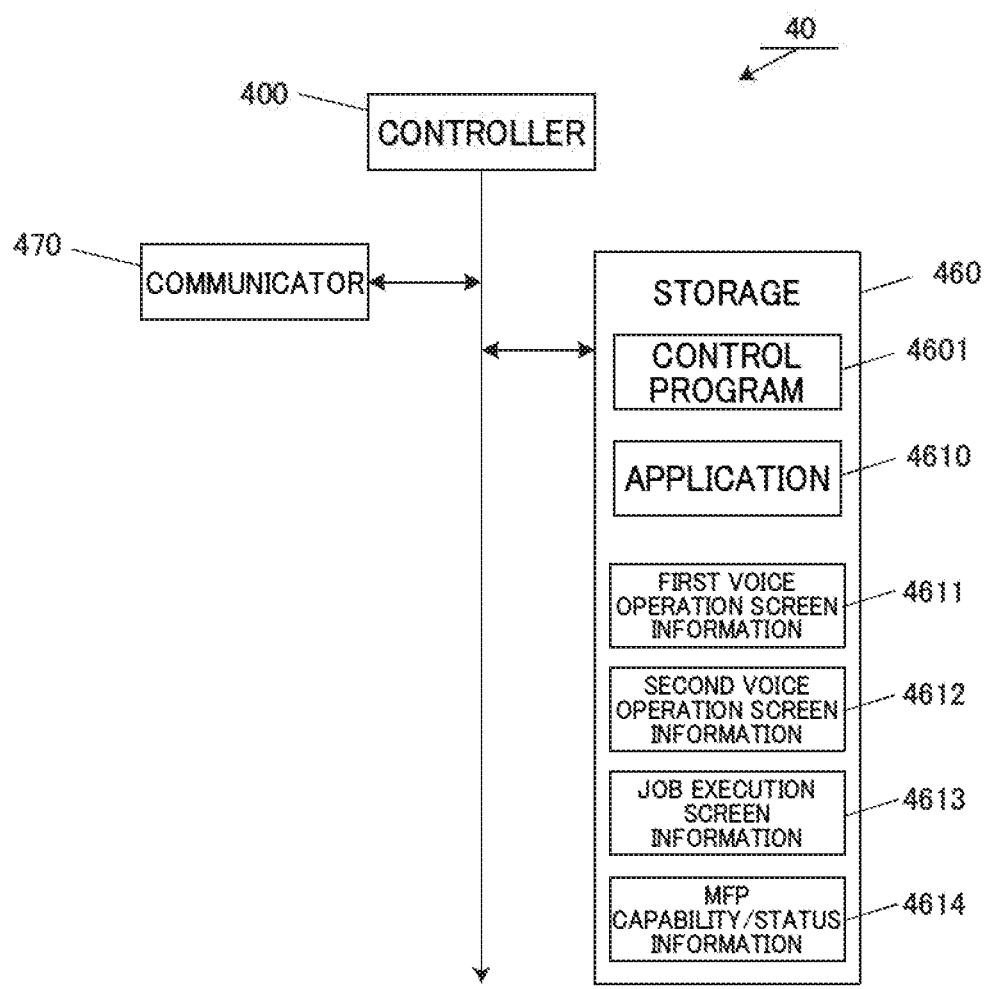
FIG. 6 is a block diagram illustrating a configuration of a voice recognition server included in the image forming system.

FIG. 1 is an example of an embodiment of the present invention, and is an explanatory diagram illustrating a configuration of an image forming system employing an image forming apparatus according to a first embodiment of the present invention. FIG. 2 is an explanatory diagram illustrating an entire configuration of the image forming apparatus. FIG. 3 is a block diagram illustrating an electrical configuration of the image forming apparatus. FIG. 4 is a block diagram illustrating a configuration of a voice/audio apparatus included in the image forming system. FIG. 5 is a block diagram illustrating a configuration of a voice recognition server included in the image forming system. FIG. 6 is a block diagram illustrating a configuration of an interactive server included in the image forming system. FIG. 7 is an explanatory diagram illustrating an example of a management table stored in a storage of the interactive server.

Configuration of Image Forming System

As illustrated in FIG. 1, the image forming system includes an image forming apparatus 10, a voice/audio apparatus 20, a voice recognition server 30, and an interactive server 40, the servers being external servers. Apparatuses and servers establish communication connection with each other via a network NW.

In an image forming system 1, the voice recognition server 30 recognizes voice input through the voice/audio apparatus 20, the voice is converted into text data, and the text data is transmitted to the interactive server 40. Then, the interactive server 40 indicates a command to the image forming apparatus 10, based on the received text data.

In the first embodiment, the image forming apparatus 10 polls the interactive server 40 to acquire the indication. Then, the image forming apparatus 10 displays, on a display, a voice operation screen including an indication (text) of the command, based on the acquired indication. The image forming apparatus 10 executes a job in response to a voice command from the voice/audio apparatus 20.

Configuration of Image Forming Apparatus

As illustrated in FIG. 1, the image forming apparatus 10 is communicably connectable to the voice/audio apparatus 20, the voice recognition server 30, and the interactive server 40 via the network NW. The image forming apparatus 10 is an information processing apparatus for outputting an image by an electrophotographic method.

As illustrated in FIG. 3, the image forming apparatus 10 mainly includes a controller 100, an image inputter 110, a document reader 112, an image processor 120, an image former 130, an operation processor 140, a display 150, a storage 160, and a communicator 170.

The controller 100 controls the whole image forming apparatus 10. The controller 100 realizes various functions by reading and executing various programs, and includes, for example, one or more arithmetic devices (for example, central processing units (CPUs)).

The image inputter 110 reads image data input into the image forming apparatus 10. The image inputter 110 is connected to the document reader 112 that reads an image of a document, and receives image data output from the document reader 112. The image inputter 110 stores the input image data into read data 1602 of the storage 160.

Further, the image inputter 110 may receive image data from a storage medium such as a universal serial bus (USB) memory and a secure digital (SD) card. The image inputter 110 may include a communicator that connects the image inputter 110 with another terminal device and receive image data from the other terminal device.

The image processor 120 forms, on a recording medium (for example, a recording sheet), output data based on image data. For example, the image processor 120 feeds a recording sheet from a sheet feed tray 122 as illustrated in FIG. 2. The image processor 120 forms an image on the surface of the recording sheet, and discharges the recording sheet from a sheet discharge tray 124. The image processor 120 includes, for example, an electrophotographic laser printer.

The image former 130 performs various image processing on image data. The image former 130 forms an output image, based on the image data on which image processing is performed.

The operation processor 140 receives an operation instruction from a user. The operation processor 140 includes a key switch being a hardware switch, and a software switch implemented by a device, or the like that detects an input by contact. The user can use the operation processor 140 to input a function to be used and an output condition.

The display 150 is a functional element that displays various types of information to the user, and includes, for example, a liquid crystal display (LCD), an organic electroluminescent (EL) panel, and an electronic paper.

The image forming apparatus 10 may include a touch panel in which an operation panel 141 and the display 150 are integrally formed, as illustrated in FIG. 2. In this case, a method of detecting an input on the touch panel may be a common detection method such as a resistive method, touch screen technology utilizing infrared or electromagnetic induction, or a capacitive method.

The storage 160 stores various programs including a control program 1601 necessary for the operation of the image forming apparatus 10, various data including the read data 1602, and user information 1603. The storage 160 includes, for example, a solid-state drive (SSD) being a semiconductor memory, and a hard disk drive (HDD).

In the first embodiment, the image forming apparatus 10 displays, on the display 150, a standby screen for receiving a touch operation, as an initial screen. The storage 160 stores standby screen information 1611 for displaying the standby screen.

The communicator 170 communicably connects to the interactive server 40 via the network NW.

The image forming apparatus 10 (the controller 100) acquires an instruction related to the operation of the image forming apparatus 10 from the interactive server 40 via the communicator 170. The controller 100 acquires, from the interactive server 40, an instruction corresponding to a voice command input to the voice/audio apparatus 20 described later.

In the first embodiment, in the image forming apparatus 10, when a voice operation is started, the controller 100 performs control to display a display screen (first display screen) on the display 150, based on an instruction from the interactive server 40. The first display screen is a display screen (first voice operation screen) used when the user performs a voice operation.

In the first embodiment, the image forming apparatus 10 (the controller 100) switches a voice operation display screen (the first voice operation screen) to another voice operation display screen (second voice operation screen).

Configuration of Voice/Audio Apparatus

As illustrated in FIG. 4, the voice/audio apparatus 20 mainly includes a controller 200, a voice inputter (microphone) 210, an audio outputter (speaker) 220, and a communicator 270.

The controller 200 controls the whole voice/audio apparatus 20.

The controller 200 includes, for example, one or more arithmetic devices (for example, CPUs).

The voice inputter 210 receives voice uttered by the user and outputs the voice as audio data. The voice inputter 210 is typically an input device such as a microphone, but may be an externally connected device. Further, the voice inputter 210 may simply output an input audio signal to the controller 200, and the controller 200 may output the audio signal as audio data.

The audio outputter 220 outputs audio data. The audio outputter 220 is typically an output device such as a speaker, but may be an externally connected device. The audio outputter 220 may demodulate the input audio data to output the demodulated data as audio. The audio outputter 220 may receive and output audio demodulated from the audio data by the controller 200.

The voice/audio apparatus 20 may be a conversational voice/audio apparatus such as a so-called smart speaker serving as a microphone and a speaker. Further, the voice/audio apparatus 20 may be directly connected to the network NW, or may be directly connected to the image forming apparatus 10.

Configuration of Voice Recognition Server

As illustrated in FIG. 5, the voice recognition server 30 mainly includes a controller 300, a storage 360, a communicator 370, and a voice recognizer 380 that recognizes voice.

The controller 300 controls the whole server (voice recognition server) 30 that recognizes voice.

The controller 300 realizes various functions by reading and executing various programs, and includes, for example, one or more arithmetic devices (for example, CPUs).

The storage 360 stores various programs including a control program 3601 necessary for the operation of the voice recognition server 30, various data, and user information. The storage 360 includes, for example, an SSD being a semiconductor memory, and an HDD.

The communicator 370 establishes communication connection with the image forming apparatus 10 and the interactive server 40 via the network NW.

The voice recognizer 380 receives voice uttered by the user, recognizes the voice, and converts the voice into text data. The controller 300 transmits, to the interactive server 40, the text data converted based on the voice uttered by the user, in the voice recognizer 380. Any of the conventional voice recognition methods may be employed for a voice recognition method. For example, a method disclosed in Japanese Unexamined Patent Application Publication No. 2018-49230 (Title of the invention: DICTIONARY CREATION DEVICE, DICTIONARY CREATION PROGRAM, SPEECH RECOGNITION DEVICE, SPEECH RECOGNITION PROGRAM AND RECORDING MEDIUM) or a method disclosed in Japanese Unexamined Patent Application Publication No. 2004-219693 (Title of the invention: DEVICE, METHOD, AND PROGRAM FOR SPEECH RECOGNITION, AND PROGRAM RECORDING MEDIUM) may be employed.

Configuration of Interactive Server

As illustrated in FIG. 6, the interactive server 40 that provides an interactive service mainly includes a controller 400, a storage 460, and a communicator 470.

The controller 400 controls the whole interactive server 40.

The controller 400 realizes various functions by reading and executing various programs, and includes, for example, one or more arithmetic devices (for example, CPUs).

In the first embodiment, the controller 400 issues a specific instruction to the image forming apparatus 10 based on data (for example, text data represented by text) transmitted from the voice recognition server 30.

The storage 460 stores various programs including a control program 4601 necessary for the operation of the interactive server 40, various data, and user information. The storage 460 includes, for example, an SSD being a semiconductor memory, and an HDD.

In the first embodiment, the storage 460 further stores an application 4610 used for a voice operation.

The storage 460 stores, as information of a display screen used for the application 4610, first voice operation screen information 4611 being information of a first display screen, second voice operation screen information 4612 being information of a second display screen, and job execution screen information 4613 being information of a display screen displayed when a job is executed. The storage 460 further stores an MFP capability/status information 4614. The information of the display screen (screen information) is information for generating a screen in the image forming apparatus 10. The screen information is represented by, for example, hypertext markup language (HTML)5, extensible markup language (XMI), or the like.

As illustrated in FIG. 7, the MFP capability/status information 4614 stores, as MFP information, an ID, a name, an IP address, capability information, and a status of MFP, for three MFPs.

Specifically, as capability information of the MFPs, for each of "Office machines No. 1 to 3" being names of three image forming apparatuses managed by MFP IDs, the MFP capability/status information 4614 stores information of the IP address (for example, "192.168.0.11"), the capability information of the image forming apparatus (for example, the printing sheet sizes supported by the image forming apparatus, the settable print modes (color printing, monochrome printing), the printing side (duplex, simplex), the post-processing (with/without staple)), and the status (for example, "ready for print"). Here, the status indicates a state of the image forming apparatus. For example, the status may indicate "ready for print" in which the image forming apparatus is ready for printing, "not ready for print" in which the image forming apparatus is not ready for printing. "out of paper" or "paper jam" indicating an error, and "communication NA" indicating a hardware failure.

The communicator 470 establishes communication connection with the voice recognition server 30 and the image forming apparatus 10 via the network NW.

In the first embodiment, the interactive server 40 transmits a voice operation display screen to the image forming apparatus 10, based on the text data transmitted from the voice recognition server 30. Further, the interactive server 40 instructs the image forming apparatus 10 to switch the display screen from the standby screen for receiving a touch operation to a voice operation screen.

Regarding the switching of the voice operation display screen, the interactive server 40 may transmit the voice operation display screen to the image forming apparatus 10 each time the instruction for voice operation is issued. Further, the image forming apparatus 10 may first store the information of the voice operation display screen transmitted from the interactive server 40, and thereafter switch the display screen on the image forming apparatus 10 in response to the instruction for voice operation.

It is noted that the voice operation display screen may be previously stored in the image forming apparatus 10. In this case, the image forming apparatus 10 switches the display screen from the standby screen for receiving a touch operation to the voice operation screen in response to the instruction, from the interactive server 40, for switching an operation screen.

In the first embodiment, in the interactive server 40, the controller 400 transmits, based on the text data (for example, text data corresponding to a command) transmitted from the voice recognition server 30, the voice operation display screen corresponding to the text data, to the image forming apparatus 10. The interactive server 40 instructs the image forming apparatus 10 to switch the display screen to the voice operation display screen corresponding to the text data (for example, a display screen for instructing a setting related to a command).

Transition of Operation Screen in Voice Operation of Image Forming Apparatus

Next, a display screen displayed on the display 150 when a command is indicated by a voice operation, in the image forming apparatus 10 according to the first embodiment will be described with reference to the drawings.

Figure 8:
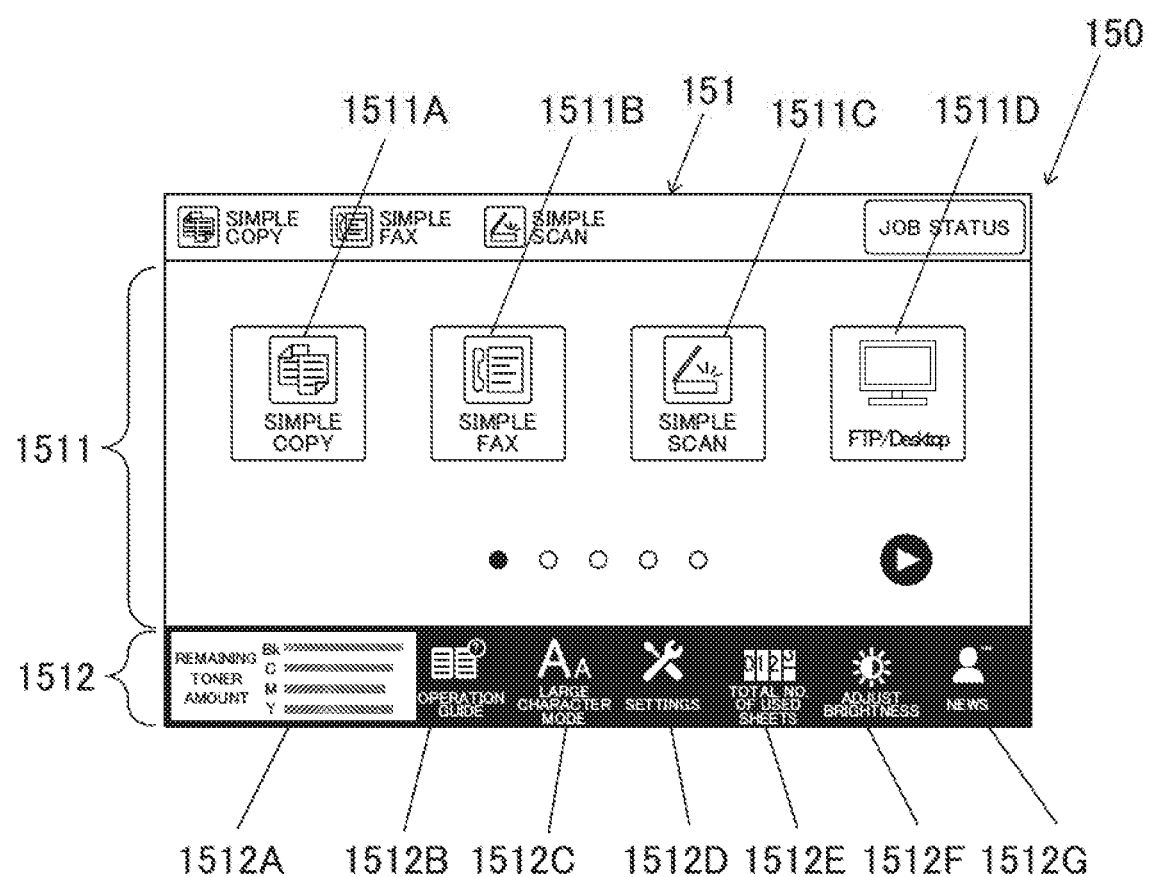
FIG. 8 is an explanatory diagram illustrating an example of a standby screen displayed on a display of the image forming apparatus.
Figure 9:
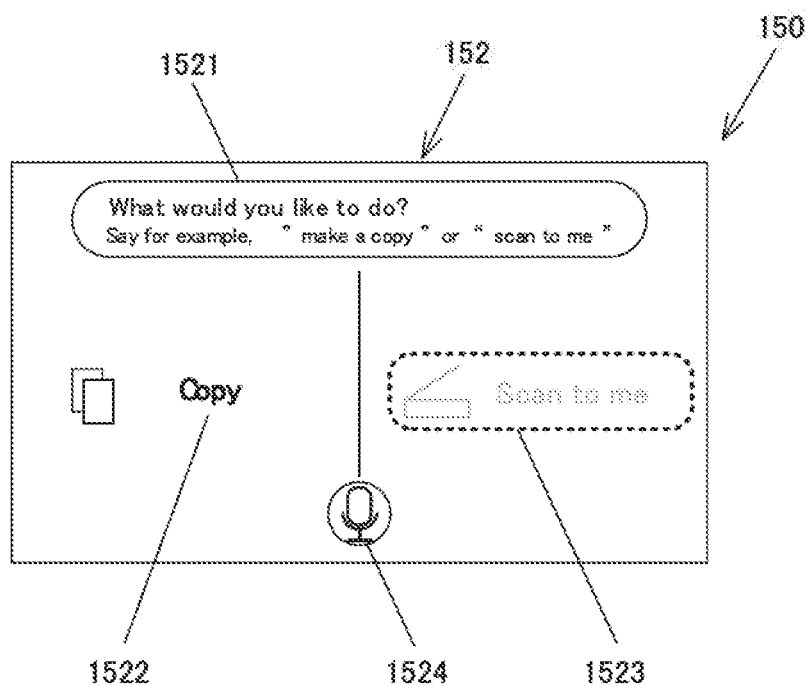
FIG. 9 is an explanatory diagram illustrating an example of a first voice operation screen displayed on the display when a voice operation is started in the image forming apparatus.
Figure 10:
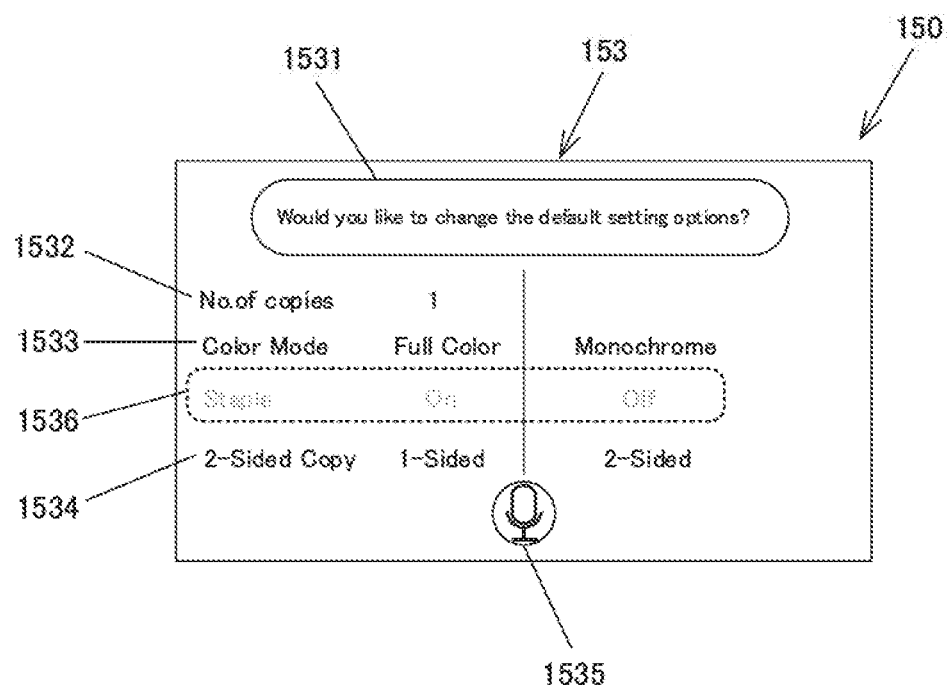
FIG. 10 is an explanatory diagram illustrating an example of a second voice operation screen displayed on the display when a command is indicated by a voice operation in the image forming apparatus.
Figure 11:
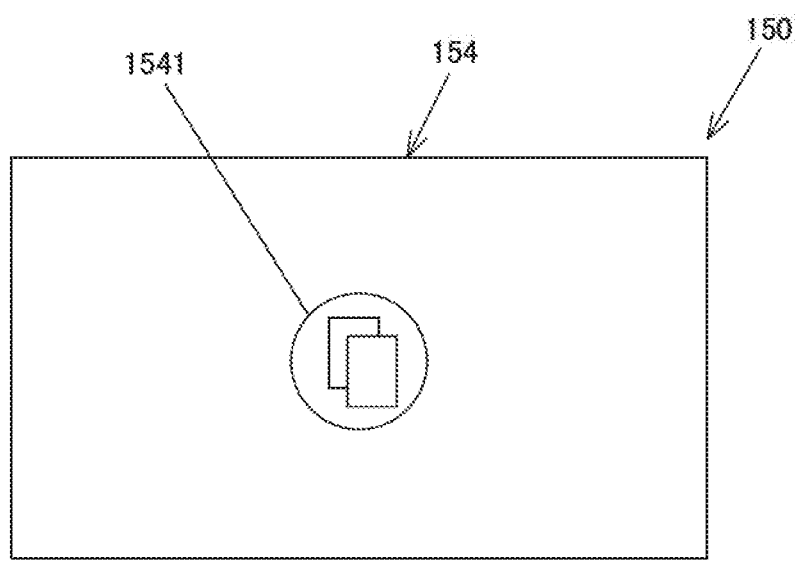
FIG. 11 is an explanatory diagram illustrating an example of a job execution screen when a job is executed by a voice operation in the image forming apparatus.

FIG. 8 is an explanatory diagram illustrating an example of the standby screen displayed on the display of the image forming apparatus according to the first embodiment. FIG. 9 is an explanatory diagram illustrating an example of the first voice operation screen displayed on the display when a voice operation is started in the image forming apparatus. FIG. 10 is an explanatory diagram illustrating an example of the second voice operation screen displayed on the display when a command is indicated by a voice operation in the image forming apparatus. FIG. 11 is an explanatory diagram illustrating an example of a job execution screen being a third display screen when a job is executed by a voice operation in the image forming apparatus.

Standby Screen (Touch Operation Basic Menu Screen)

First, as illustrated in FIG. 8, the display 150 of the image forming apparatus 10 displays a touch operation basic menu screen 151 as a standby screen in a touch operation mode.

The touch operation basic menu screen 151 is an initial setting screen in the touch operation mode of the image forming apparatus 10. The touch operation basic menu screen 151 is formed based on the standby screen information 1611 stored in the storage 160 of the image forming apparatus 10.

On the touch operation basic menu screen 151, displayed are a processing function setting area 1511 for setting processing to be executed, and an information/setting area 1512 for showing information of the apparatus status and performing detailed setting.

In the processing function setting area 1511, displayed are operation keys 1511*a*, 1511*b*, 1511*c*, and 1511*d* respectively corresponding to a simple copy function, a simple fax function, a simple scan function, and a desktop display function provided as processing functions.

In the information/setting area 1512, displayed are a remaining toner amount indicator 1512*a*, an operation guide key 1512*b*, a character mode setting key 1512*c*, a setting key 1512*d*, a total number of used sheets indicator 1512*e*, a brightness adjustment key 1512*f*, and a news key 1512*g*.

The remaining toner amount indicator 1512*a* displays the remaining amount of toner for each color.

The operation guide key 1512*b* is used to display a guide for each of operations, in response to a touch operation.

The character mode setting key 1512*c* is used to set a character size.

The setting key 1512*d* is used to make various detailed settings.

The brightness adjustment key 1512*f* is used to adjust brightness.

The news key 1512*g* is used to notify the user of the state of the apparatus, the management state, and the like.

First Voice Operation Screen at Start of Voice Operation

In the image forming apparatus 10, when a voice operation is started by a user's voice instruction, as illustrated in FIG. 9, the display 150 switches the standby screen in the touch operation mode to a first voice operation screen 152 in a voice operation mode.

Specifically, the user utters voice (such as a conversation or a voice command including a keyword) including the content for which the user desires to start a voice operation. The user's voice is transmitted as text data to the interactive server 40 via the voice/audio apparatus 20 and the voice recognition server 30. The interactive server 40 recognizes and analyzes the text data, and transmits a first voice operation screen switching instruction to the image forming apparatus 10. The image forming apparatus 10 switches the standby screen in the touch operation mode to the first voice operation screen 152, based on the first voice operation screen switching instruction.

The first voice operation screen 152 is a voice operation screen displayed at the time of a voice operation in the voice operation mode of the image forming apparatus 10. The image forming apparatus 10 generates the first voice operation screen 152 based on the first voice operation screen information 4611 stored in the storage 460 of the interactive server 40.

Processing functions instruct able by a voice operation in the image forming apparatus 10 are displayed on the first voice operation screen 152. Specifically, the image forming apparatus 10 displays, on the first voice operation screen 152, a message 1521 inquiring a content to be executed, a copy display 1522 being an indication of an icon and a text indicating copy processing being an executable processing function, and a scan display 1523 being an indication of an icon and a text indicating an executable scan processing function. In the voice operation mode (the mode in which the first voice operation screen 152 is displayed), the text is displayed together with an icon, and thus, the user can easily visually recognize the processing functions executable by the image forming apparatus 10, making it easier for the user to utter the processing function. Therefore, the image forming apparatus 10 can be expected to exhibit an effect to improve the user operability.

The icon as used herein is an identifiable display in which characters, pictograms, symbols, and the like are schematically illustrated, with which the user identifies the operation or the state. It is noted that the icon may be a single character of text or a combination of several characters. That is, an icon being information with which the operation can be identified, and a text for explaining the operation content may be displayed.

The message 1521 functions as text information used for utterance in the voice operation. That is, a part of the text displayed in the message serves as effective audio data in the voice operation when being uttered.

In a case of an image forming apparatus without a scan function, as illustrated in FIG. 9, the scan display 1523 in the broken line area is displayed in a gray-out state on the first voice operation screen 152.

In addition, on the first voice operation screen 152, an audio input display 1524 is displayed to allow the user to visually confirm that the input operation in the image forming apparatus 10 is executed by a voice operation. In other words, an icon is displayed that allows the user to visually recognize that the current input operation mode is the voice operation mode. The first voice operation screen 152 is not configured to be operated by a touch operation.

In this manner, on the first voice operation screen 152, a comment responded to the voice operation is displayed as the text message 1521, and the copy display 1522 and the scan display 1523 indicating the executable processing functions are displayed, and the audio input display 1524 is displayed. Therefore, the user can easily confirm a next instruction which the user should make by the voice operation.

The first voice operation screen 152 may only display an executable processing function without displaying an icon. The display indicating the processing function may be a command as it is. For example, in FIG. 9, "Copy" is a command or a part of the command. If a word including "Copy" is uttered by the user, the image forming apparatus 10 executes the copy function.

Further, as illustrated in FIG. 9, the image forming apparatus 10 may display a message including a command. Upon receiving a command or a word including the command uttered by the user, the image forming apparatus 10 executes a function corresponding to the command.

That is, as illustrated in FIG. 8, a normal display screen (the display screen for touch operation) displays items (state items) such as a mode switching, a state indication, and a setting change. However, as illustrated in FIG. 9, the display screen used to perform a voice operation (the voice operation display screen) simply displays a command. The voice operation display screen displays only a command as compared to the normal display screen. It is preferable that the state items (items such as a mode switching, a state indication, and a setting change) displayed on the normal display screen are not displayed on the voice operation display screen.

Further, the command is intelligibly displayed on the voice operation display screen. For example, the character size is larger than usual. Items and states not related to a voice operation are not displayed. The image forming apparatus 10 can display items other than the command on the voice operation display screen; however, in this case, it is preferable to display the command prominently.

As described above, it is preferable that no extra items are displayed on the voice operation display screen as compared to the normal display screen (the display screen for touch operation). That is, the items used for a touch operation are hidden, and the items necessary for a voice operation are displayed.

Second Voice Operation Screen for Instructing Job Setting by Voice Operation

In the image forming apparatus 10, if a job to be executed is set by user's utterance while the first voice operation screen 152 is displayed, as illustrated in FIG. 10, the first voice operation screen 152 is switched to a second voice operation screen 153.

The second voice operation screen 153 is a voice operation screen displayed at the time of a voice operation in the image forming apparatus 10. The image forming apparatus 10 generates the second voice operation screen 153 based on the second voice operation screen information 4612 stored in the storage 460 of the interactive server 40.

A job content for receiving a setting (a setting being referred when a job is executed) by a voice operation in the image forming apparatus 10 is displayed on the second voice operation screen 153. Specifically, the image forming apparatus 10 displays, on the second voice operation screen 153, a message 1531 inquiring a content to be set, a number-of-copies display 1532 serving as a command display indicating a command for instructing the apparatus, a print color mode display (color or monochrome) 1533, and a duplex printing display (simplex: 1-sided, duplex: 2-sided) 1534.

In addition, on the second voice operation screen 153, an audio input display 1535 is displayed to allow the user to visually confirm that the input operation in the image forming apparatus 10 is executed by a voice operation.

In a case of an image forming apparatus without a stapling function, as illustrated in FIG. 10, the image forming apparatus 10 may display a staple display 1536 in the broken line area in a gray-out state on the second voice operation screen 153. The second voice operation screen 153 is not configured to be operated by a touch operation.

The message display areas displayed on the first voice operation screen and the second voice operation screen may be displayed at the same position.

As described above, the image forming apparatus 10 prominently displays a command on the voice operation display screen. The image forming apparatus 10 preferably displays only the items that can be operated by voice and the setting contents. The image forming apparatus 10 can display an item other than the items that can be operated by voice; however, in this case, it is preferable to prominently display the items that can be operated by voice and the setting contents. For example, the image forming apparatus 10 displays the items that can be operated by voice and the setting contents to be larger than other displays, takes a larger margin around the items, or identifiably display the background of the items, to clearly display the items that can be operated by voice and the setting contents.

Job Execution Screen During Voice Operation

In the image forming apparatus 10, if a job is executed by a voice operation while the second voice operation screen 153 is displayed, the second voice operation screen 153 is switched to a job execution screen 154 as illustrated in FIG. 11.

The job execution screen 154 is a voice operation screen displayed at the time of a voice operation in the image forming apparatus 10. The image forming apparatus 10 generates the job execution screen 154 based on the job execution screen information 4613 stored in the storage 460 of the interactive server 40.

A display image 1541 indicating a job being executed is displayed on the job execution screen 154. Specifically, when copying is executed, the image forming apparatus 10 displays, on the job execution screen 154, the display image 1541 indicating "copy processing" as illustrated in FIG. 11.

Operation Processing by Voice Operation in Image Forming System

Next, in the image forming system 1 according to the first embodiment, operation processing performed when a user operates the image forming apparatus 10 by a voice instruction will be described with reference to the drawings.

Figure 12:
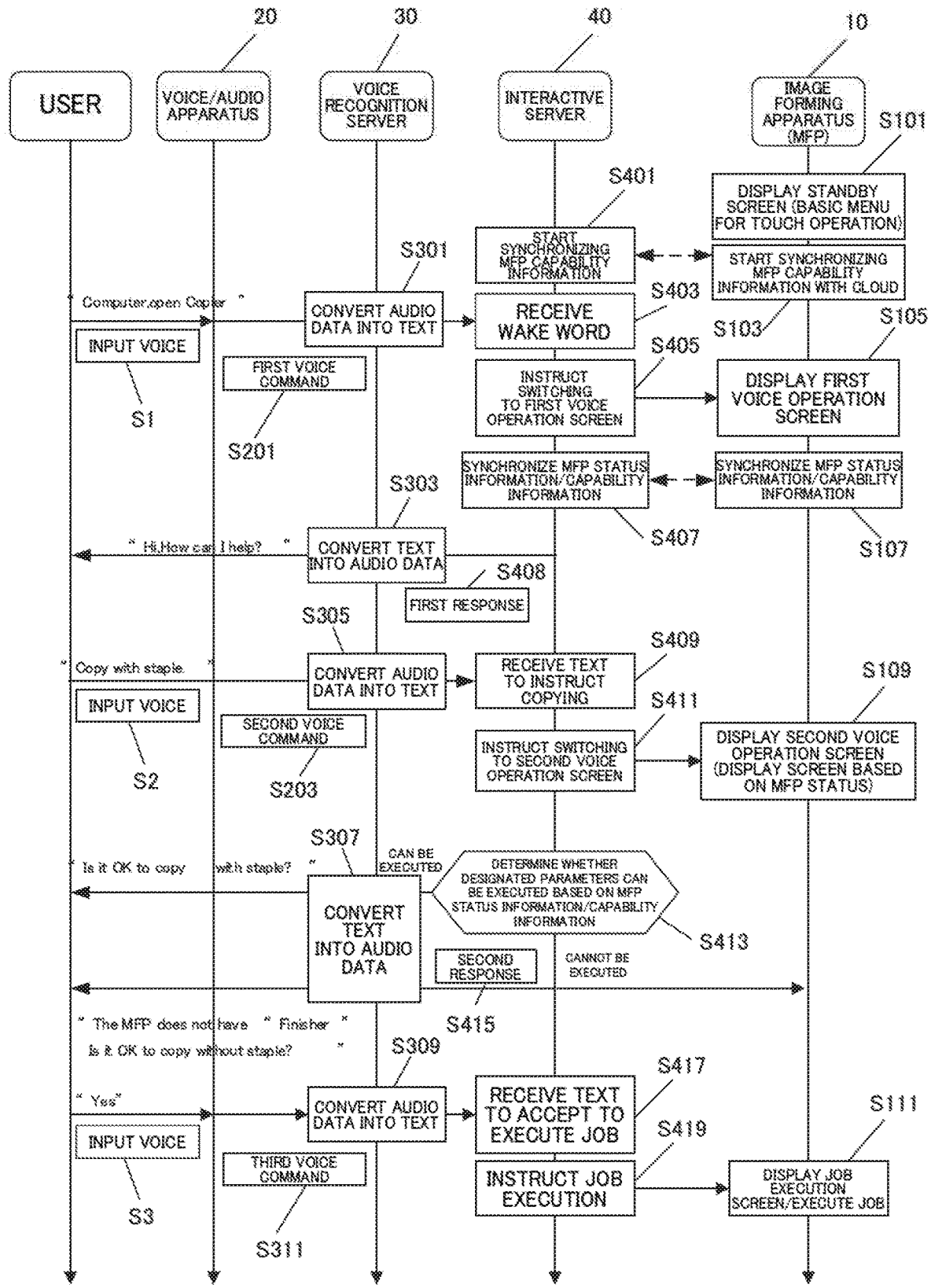
FIG. 12 is a sequence chart illustrating operation processing when a voice instruction is issued in the image forming system according to the first embodiment.

FIG. 12 is a sequence chart illustrating a case when a user operates the image forming apparatus 10 by a voice instruction. First, the user instructs the voice/audio apparatus 20 by voice to start an operation (81). For example, the user issues an instruction by uttering "Computer, open Copier". The voice/audio apparatus 20 transmits the voice input by the user to the voice recognition server 30 as a first voice command (S201).

The voice recognition server 30 converts, in the voice recognizer 380, audio data of the first voice command into text data. Then, the voice recognition server 30 recognizes a "Wake word" for starting a voice operation and transmits the "Wake word" to the interactive server 40 (S301). The "Wake word" includes a word for switching the mode to the voice operation mode, and includes a command or a conversation. In the present embodiment, the "Computer" corresponds to the "Wake word".

The interactive server 40 starts synchronizing multi function printer (MFP) capability information with the image forming apparatus 10 (8401). The interactive server 40 may synchronize the capability information periodically (for example, every five minutes, every hour, and every time at startup), or may synchronize the capability information at a timing when a command or a word is received from the voice recognition server 30.

Upon receiving the "Wake word" transmitted from the voice recognition server 30 (S403), the interactive server 40 instructs the image forming apparatus 10 to switch the standby screen to the first voice operation screen 152 for performing a voice operation (405). At this time, the interactive server 40 transmits information of the first voice operation screen (the first voice operation screen information 4611) to the image forming apparatus 10.

The image forming apparatus 10 displays the touch operation basic menu screen 151 operated by a touch operation, as the standby screen (S101). The image forming apparatus 10 starts synchronizing the MFP capability information with the interactive server 40 (8103).

Upon receiving, from the interactive server 40, an instruction to switch the touch operation basic menu screen 151 to the first voice operation screen 152, the image forming apparatus 10 switches the standby screen in the touch operation mode (the touch operation basic menu screen 151) to the first voice operation screen 152 in the voice operation mode to display the first voice operation screen 152 on the display 150 (S105).

If a next voice command is not received immediately after activation of the image forming apparatus 10 or within a predetermined time while the first voice operation screen 152 is displayed, the image forming apparatus 10 may display the touch operation basic menu screen 151 for receiving a touch operation.

The interactive server 40 and the image forming apparatus 10 synchronize the MFP status information/capability information (S407, S107). Then, the interactive server 40 transmits a first response in text to the voice recognition server 30 (S408).

The voice recognition server 30 converts the text transmitted from the interactive server 40 into audio data (S303). Further, the voice recognition server 30 makes, via the voice/audio apparatus 20, the first response to the user by voice saying "Hi, how can I help" ?

The user hears (confirms) the first response, and instructs the voice/audio apparatus 20 by voice saying "Copy with staple" (S2). The voice/audio apparatus 20 transmits the input voice to the voice recognition server 30 as a second voice command (8203).

The voice recognition server 30 converts, in the voice recognizer 380, audio data of the second voice command into text data indicating that copying is to be performed. Further, the voice recognition server 30 transmits, to the interactive server 40, the text data indicating that copying is to be performed (S305).

The interactive server 40 receives the text data indicating that copying is to be performed transmitted from the voice recognition server 30 (8409). Then, the interactive server 40 instructs the image forming apparatus 10 to switch the first voice operation screen 152 to the second voice operation screen 153 for instructing a job setting by a voice operation (S411). At this time, the interactive server 40 transmits the second voice operation screen information 4612 to the image forming apparatus 10.

The image forming apparatus 10 synchronizes status information and capability information of the image forming apparatus 10 with the interactive server 40. The image forming apparatus 10 may generate the second voice operation screen information 4612 in accordance with a result of synchronization. For example, the interactive server 40 generates and transmits the second voice operation screen information 4612 in which the stapling function is grayed out, to the image forming apparatus 10 without a stapling function. Thus, the image forming apparatus 10 displays the second voice operation screen in which the stapling function is grayed out.

Upon receiving, from the interactive server 40, an instruction to switch the first voice operation screen 152 to the second voice operation screen 153, the image forming apparatus 10 switches the first voice operation screen 152 to the second voice operation screen 153 to displays the second voice operation screen 153 on the display 150 (S109).

The second voice operation screen 153 is appropriately updated as needed. As will be described later, for example, in S413, when the interactive server 40 asks the user to determine whether it is possible to execute a designated parameter, the second voice operation screen 153 may be updated to display a necessary message.

The interactive server 40 determines whether it is possible to execute the designated parameter, based on the MFP status information/capability information (S413). If it is determined that the execution of the parameter is not possible, the interactive server 40 converts, via the voice recognition server 30, second response text data indicating "The MFP does not have 'Finisher'. Is it OK to copy without staple?" into audio data, and the voice/audio apparatus 20 utters the audio data (S307). Further, the interactive server 40 may transmit update information of the second voice operation screen 153 to the image forming apparatus 10.

Figure 13:
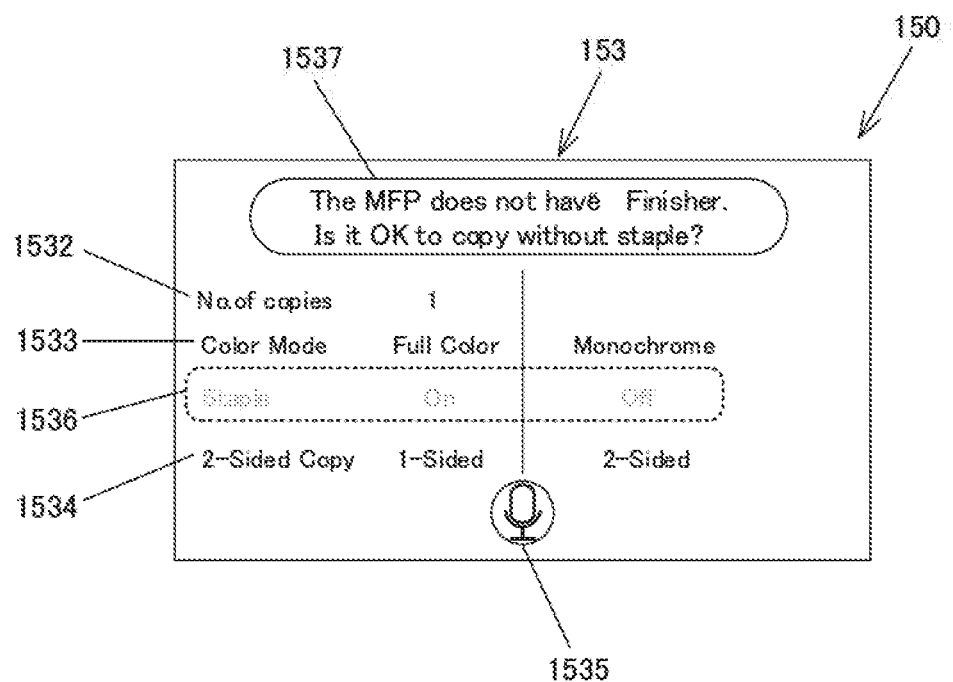
FIG. 13 is an explanatory diagram illustrating an example of a text message displayed on a voice operation screen of the display of the image forming apparatus in the image forming system.

If the update information is transmitted from the interactive server 40 to the image forming apparatus 10, the second voice operation screen 153 is updated. On the second voice operation screen 153, for example, as illustrated in FIG. 13, a message 1537 saying "The MFP does not have 'Finisher'. Is it OK to copy without staple?" is displayed. In addition, a message indicating that the designated job cannot be executed may be displayed on the second voice operation screen 153.

If it is determined in 8413 that the execution of the parameter is possible, the interactive server 40 converts, via the voice recognition server 30, second response text data indicating "Is it OK to copy with staple?" into audio data, and the voice/audio apparatus 20 utters the audio data (S307).

Figure 14:
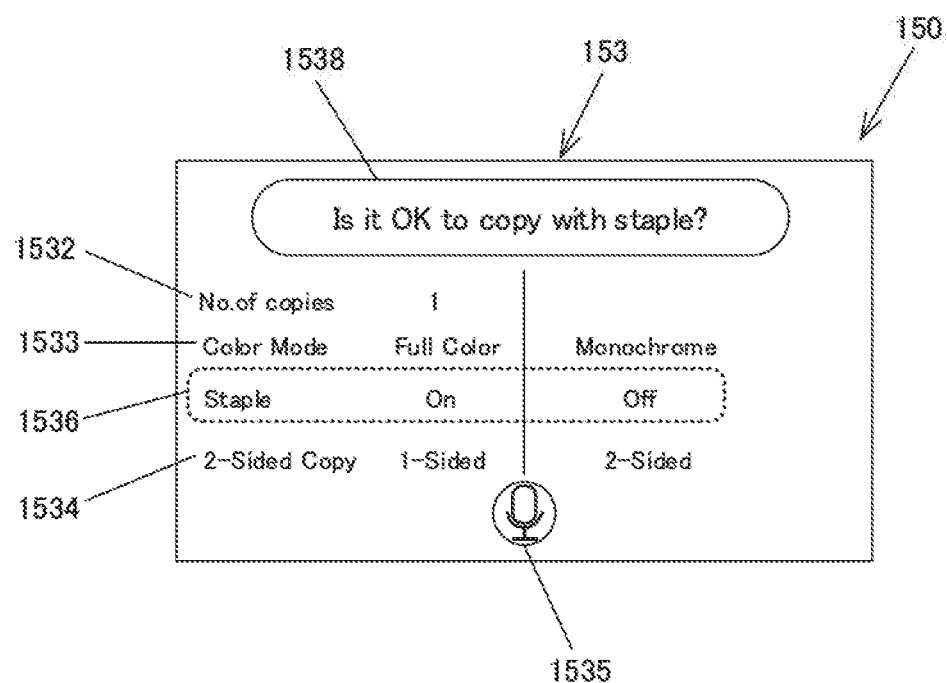
FIG. 14 is an explanatory diagram illustrating another example of the text message.

On the second voice operation screen 153 of the image forming apparatus 10, for example, as illustrated in FIG. 14, a message 1538 saying "Is it OK to copy with staple?" is displayed.

The user hears (confirms) the second response, and instructs the voice/audio apparatus 20 by voice, saying "Yes" (83). The voice/audio apparatus 20 transmits the input voice to the voice recognition server 30 as a third voice command.

The voice recognition server 30 converts, in the voice recognizer 380, audio data of the third voice command into text data indicating that the execution of the job is agreed (8309). The voice recognition server 30 transmits, to the interactive server 40, the text data indicating that the execution of the job is agreed (8311).

The interactive server 40 receives the text data indicating that the execution of the job is agreed transmitted from the voice recognition server 30 (S417). The interactive server 40 instructs the image forming apparatus 10 to execute the job (S419). At this time, the interactive server 40 transmits the job execution screen 154 to the image forming apparatus 10.

The image forming apparatus 10, in response to the instruction to execute the job, displays the job execution screen 154 on the display 150, and executes the job (8111).

As described above, when a voice operation is performed on the image forming apparatus 10, the image forming system 1 switches the touch operation basic menu screen 151 displayed on the image forming apparatus 10 to a display screen specialized for a voice operation to display the specialized display screen. Thus, the user can clearly indicate a command while watching the voice operation display screen. As a result, the user can easily execute the job.

Accordingly, the image forming system 1 can solve the problem that in voice operations in conventional image forming apparatuses, a voice instruction is issued through a unidimensional operation interface, and thus, it is difficult to confirm the contents at once when the image forming apparatus is operated by voice. Further, the image forming system 1 can solve the problem that in conventional voice operations, it takes too much time to confirm the instruction with a voice message.

Further, in voice operations in conventional image forming apparatuses, when various operations are performed by voice instructions, a user needs to memorize an utterance method, instruction contents, and the like, or to learn the operation. However, the image forming system 1 displays the voice operation display screen on the display 150, allowing a user to easily perform a voice operation.

In addition, in conventional image forming apparatuses, in general, settings and functions that can be input or changed by a voice operation are often fewer than functions that can be operated by a screen operation, and thus, a user interface (UI) screen not taking into account a voice operation may mislead a user with regard to functions that can be operated by a voice operation. Also for such a problem, the image forming system 1 can provide a UI screen to be easily operated by the user, by displaying a voice operation display screen on the display 150 to clarify functions that can be operated by a voice operation.

In the first embodiment, as illustrated in FIGS. 9 and 10, the positions of the message display areas where the messages 1521 and 1531 are displayed are in common on the first voice operation screen 152 and the second voice operation screen 153. As a result, the user can easily recognize the messages.

With the above-described configuration, according to the first embodiment, in the image forming system 1, the image forming apparatus 10 displays the first voice operation screen 152 and the second voice operation screen 153 including a command on the display 150 while switching the two screens, in response to a voice operation, and executes a job in the image forming apparatus 10 in response to a command being input from the voice/audio apparatus 20 by a voice operation of a user. The user can confirm a display image or a text display of the command displayed on the first voice operation screen 152 or the second voice operation screen 153 to clearly input the command by voice. Therefore, the user can easily and clearly perform a voice operation for indicating a desired setting and processing of a job.

In the first embodiment, the interactive server 40 instructs the image forming apparatus 10 to display the display screen while switching among the first voice operation screen 152, the second voice operation screen 153, and the job execution screen 154, in response to a voice operation of a user. Therefore, when performing a next voice operation, the user can clearly perform a voice operation while confirming the display image and the text display for the command and the setting.

In the first embodiment, the voice/audio apparatus 20 establishes communication connection with the image forming apparatus 10 via the network NW; however, for example, the image forming apparatus 10 including a voice inputter and an audio outputter corresponding to the voice/audio apparatus 20 may output audio to the voice recognition server 30.

Second Embodiment

Next, a second embodiment will be described.

The second embodiment provides a case where in the image forming apparatus constituting the image forming system and capable of executing a job by a voice operation, the voice operation display screen transitions as needed in response to a voice operation of a user.

Figure 15:
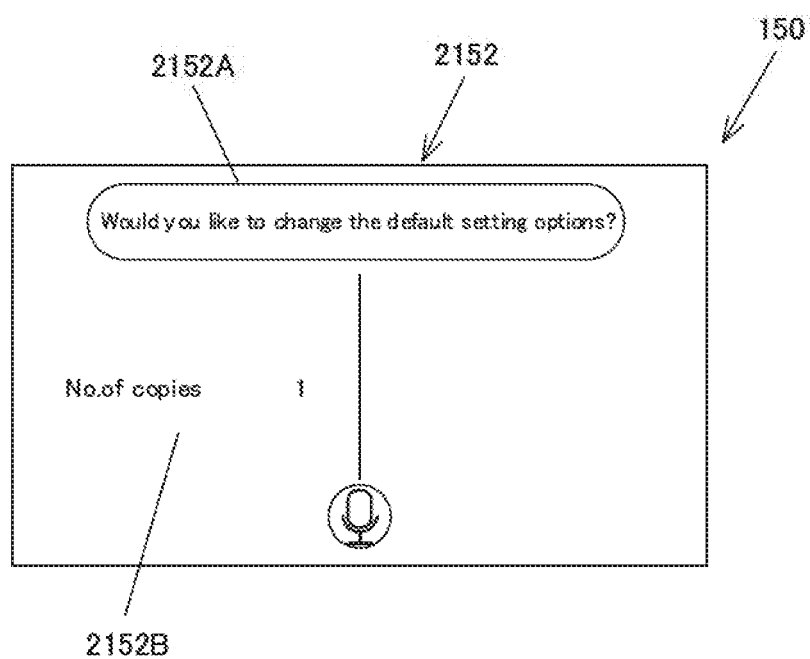
FIG. 15 is an explanatory diagram illustrating an example of a voice operation screen for setting the number of copies by a voice operation in an image forming apparatus according to a second embodiment.
Figure 16:
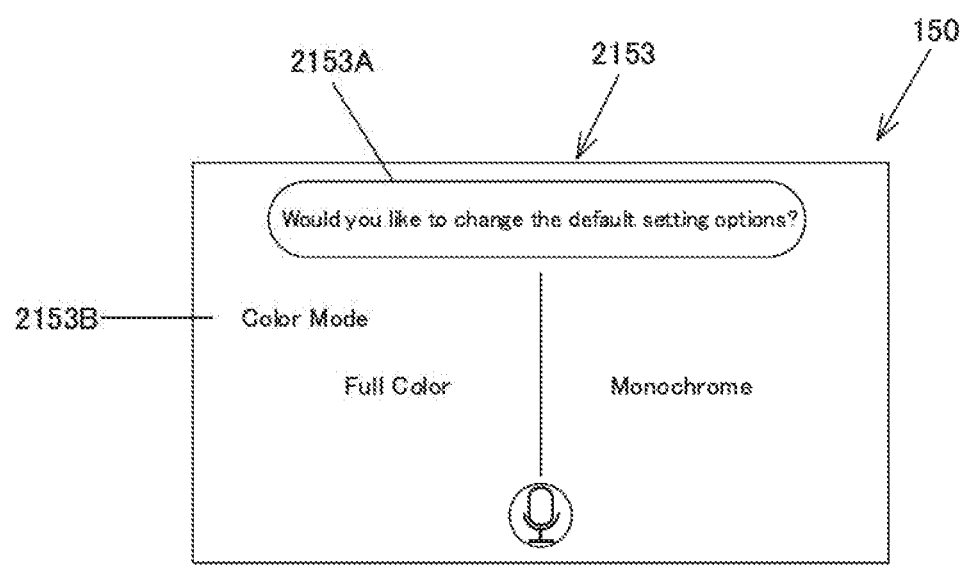
FIG. 16 is an explanatory diagram illustrating an example of a voice operation screen for setting a color mode by a voice operation in the image forming apparatus.
Figure 17:
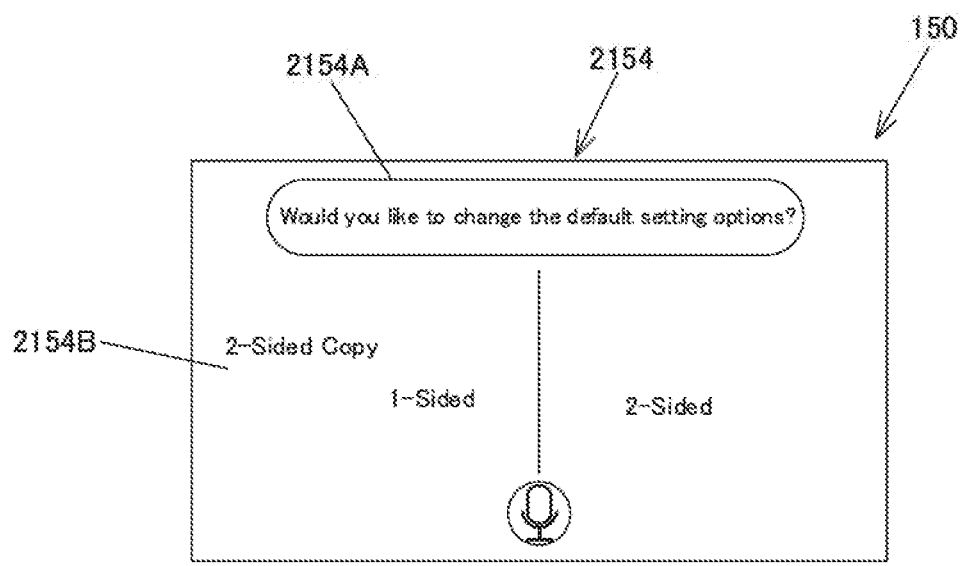
FIG. 17 is an explanatory diagram illustrating an example of a voice operation screen for setting duplex printing by a voice operation in the image forming apparatus.

FIG. 15 is an explanatory diagram illustrating an example of a voice operation screen for setting the number of copies by a voice operation in the image forming apparatus according to the second embodiment. FIG. 16 is an explanatory diagram illustrating an example of a voice operation screen for setting a color mode by a voice operation in the image forming apparatus. FIG. 17 is an explanatory diagram illustrating an example of a voice operation screen for setting duplex printing by a voice operation in the image forming apparatus.

It is noted that the image forming apparatus according to the second embodiment has substantially the same apparatus configuration as the image forming apparatus 10 according to the first embodiment. For convenience of description, the same components as those of the image forming apparatus 10 according to the first embodiment are denoted by the same reference numerals, and description thereof will be omitted. In the second embodiment, components different from those in the first embodiment will be described with reference numerals.

If a printing setting is performed by a voice operation in the image forming apparatus 10 according to the second embodiment, the image forming apparatus switches the display screen every time one setting is performed to display a display screen for performing the next setting.

For example, if the number of copies is set by a voice operation, the image forming apparatus 10 displays a number-of-copies setting screen 2152 on the display 150, as illustrated in FIG. 15.

A message 2152a inquiring a content to be set and a number-of-copies display 2152b are displayed on the number-of-copies setting screen 2152.

If the setting of the number of copies by a voice operation is completed, the image forming apparatus 10 displays, as a next setting screen, a color mode setting screen 2153 for setting a color mode in printing by a voice operation, as illustrated in FIG. 16.

A message 2153a inquiring a content to be set and a color mode display 2153b for setting full color/monochrome are displayed on the color mode setting screen 2153.

If the setting of the color mode by a voice operation is completed, the image forming apparatus 10 displays, as a next setting screen, a duplex printing setting screen 2154 for setting duplex printing (simplex or duplex) by a voice operation, as illustrated in FIG. 17.

A message 2154a inquiring a content to be set and a printing side display 2154b for setting the printing side to either of simplex (1-sided) and duplex (2-sided) are displayed on the duplex printing setting screen 2154.

With the above-described configuration, according to the second embodiment, if a printing setting is performed by a voice operation in the image forming apparatus, the display screen is switched every time one setting is performed to display the display screen for performing the next setting. Thus, the user can clearly perform detailed settings by a voice operation in each of the voice operation setting screens corresponding to each of the settings, resulting in reducing an erroneous operation due to the voice operation.

That is, the image forming apparatus 10 may display an item for changing a job setting or a command, on the display screen (voice operation display screen). For example, if the user utters a numerical value such as the number of print copies by voice, the image forming apparatus 10 sets the number of copies. If the user utters a command indicating "with staple" by voice, the image forming apparatus 10 changes the setting of the staple. The image forming apparatus 10 may display a menu number instead of a command, on the display screen.

Third Embodiment

Next, a third embodiment will be described.

The third embodiment provides a case where in the image forming apparatus constituting the image forming system and capable of executing a job by a voice operation, a voice operation display screen is displayed in response to a voice instruction of a user, and the display screen supports input processing by a touch operation.

In the third embodiment, for example, a touch operation function is applied to the copy display 1522 and the scan display 1523 on the first voice operation screen 152 displayed on the display 150 of the image forming apparatus 10 in the first embodiment, as illustrated in FIG. 9. In the third embodiment, the copy display 1622 may function as a copy selection key, and the scan display 1523 may function as a scan selection key.

With the above-described configuration, according to the third embodiment, when a voice operation is performed on the image forming apparatus 10, for example, a touch operation function is applied to the voice operation display screen displayed on the display 150. Therefore, even if failing to perform a voice operation, the user can surely perform the input processing by a touch operation.

Fourth Embodiment

Next, a fourth embodiment will be described.

In the fourth embodiment, the image forming apparatus constituting the image forming system and capable of executing a job by a voice operation performs user registration when a user operates the image forming apparatus. Further, the image forming apparatus according to the fourth embodiment may identify a user when a user operates the image forming apparatus by voice, and display, for example, a "favorite setting screen" according to the user operating the image forming apparatus. A user may be identified based on user's voice, or may be identified by inputting a login ID or a password by the user, or based on an ID card possessed by the user.

The "favorite setting screen" may be stored in the storage 160 of the image forming apparatus 10, may be stored in the storage 460 of the interactive server 40, or may be stored in another storage device that can establish communication connection with the image forming apparatus 10.

With the above-described configuration, according to the fourth embodiment, in the image forming apparatus constituting the image forming system and capable of executing a job by a voice operation, when the image forming apparatus is operated, the "favorite setting screen" is displayed for the user operating the image forming apparatus, based on the user's voice. Thus, the image forming apparatus allows the user to perform operations on the voice operation display screen familiar to the user, and therefore, provides a user interface with excellent operability.

Fifth Embodiment

Next, a fifth embodiment will be described.

The fifth embodiment provides a case where in the image forming apparatus constituting the image forming system and capable of executing a job by a voice operation, the interactive server has a simple configuration only to transfer a text of a voice recognition result to MFPs, and a text (such as an utterance sentence text or conversation for an utterance) used for a response is uttered from the MFPs via the interactive server.

Figure 18:
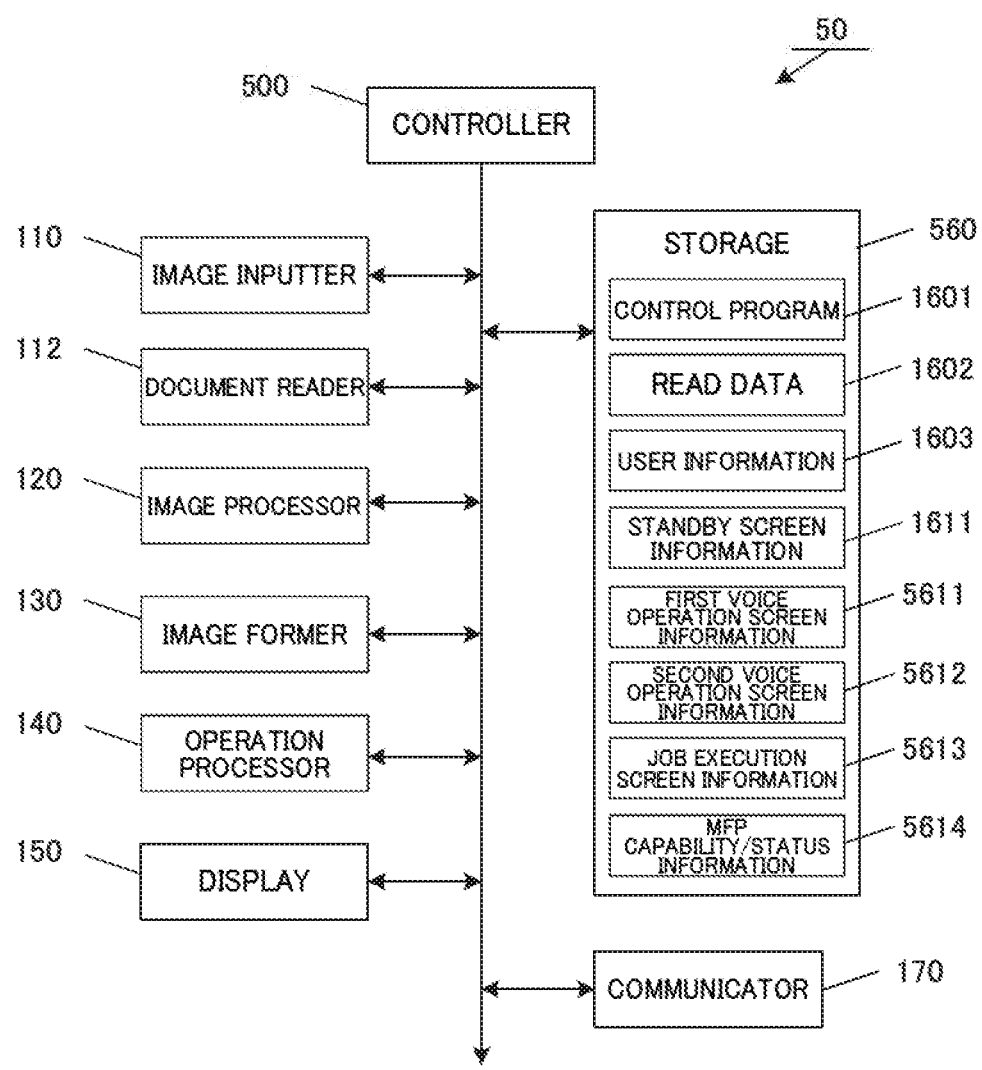
FIG. 18 is a block diagram illustrating an electrical configuration of an image forming apparatus included in an image forming system according to a fifth embodiment.
Figure 19:
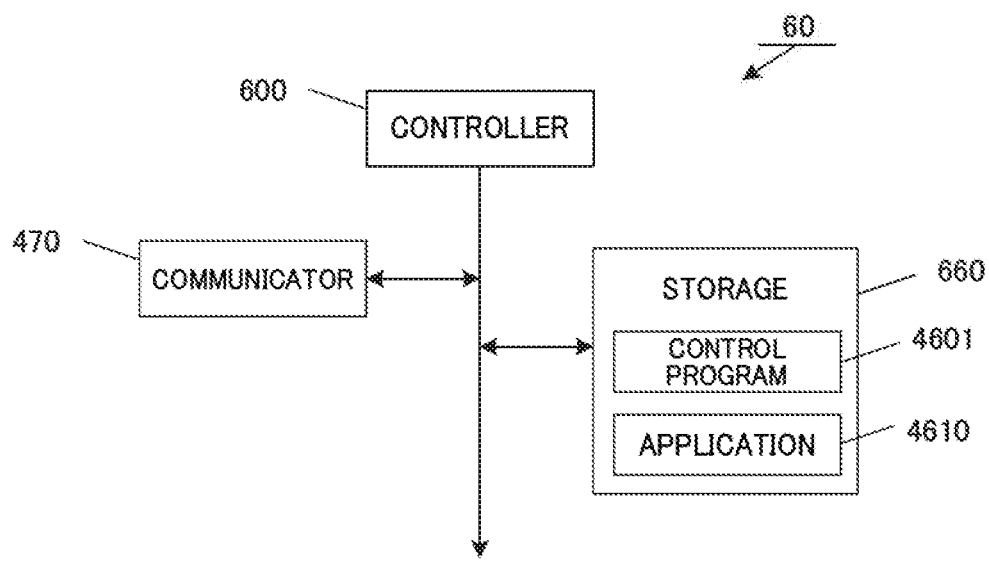
FIG. 19 is a block diagram illustrating a configuration of an interactive server included in the image forming system.

FIG. 18 is a block diagram illustrating an electrical configuration of an image forming apparatus included in an image forming system according to the fifth embodiment. FIG. 19 is a block diagram illustrating a configuration of an interactive server included in the image forming system. FIG. 20 is an explanatory diagram illustrating an example of a management table stored in a storage of the image forming apparatus.

An image forming apparatus 50 and an interactive server 60 according to the fifth embodiment have substantially the same apparatus configuration as the image forming apparatus 10 and the interactive server 40 according to the first embodiment. For convenience of description, the same components as those of the apparatus according to the first embodiment are denoted by the same reference numerals, and description thereof will be omitted. In the fifth embodiment, components different from those in the first embodiment will be described with reference numerals.

Configuration of Image Forming Apparatus

As illustrated in FIG. 18, the image forming apparatus 50 according to the fifth embodiment mainly includes a controller 500, the image inputter 110, the document reader 112, the image processor 120, the image former 130, the operation processor 140, the display 150, a storage 560, and the communicator 170.

The controller 500 controls the whole image forming apparatus 50.

The storage 560 stores various programs including the control program 1601 necessary for the operation of the image forming apparatus 50, various data including the read data 1602, the user information 1603, and the standby screen information 1611 for displaying the standby screen. In the fifth embodiment, the storage 560 further includes first voice operation screen information 5611, second voice operation screen information 5612, and job execution screen information 5613 as information of the display screen, and further includes an MFP capability/status information 5614.

As illustrated in FIG. 20, the MFP capability/status information 5614 manages, as MFP information, an ID, a name, an IP address, capability information, and a status of MFP, for the MFP.

Specifically, the MFP capability/status information 5614 manages information of the printing sheet size (A3), the print mode (color printing, monochrome printing), the printing side (duplex, simplex), and the post-processing (with staple), as the MFP capability information for the Office machine No. 1 managed by the MFP ID.

Configuration of Interactive Server

As illustrated in FIG. 19, the interactive server 60 mainly includes a controller 600, a storage 660, and the communicator 470.

The controller 600 controls the whole interactive server 60.

In the fifth embodiment, the controller 600 issues a specific instruction to the image forming apparatus 50, based on text data transmitted from the voice recognition server 30.

The storage 660 stores various programs including the control program 4601 necessary for the operation of the interactive server 60. In the fifth embodiment, the storage 660 further includes the application 4610 used for voice operations.

In the fifth embodiment, the interactive server 60 instructs the image forming apparatus 50 to switch the standby screen for receiving a touch operation to the voice operation display screen, based on the text data transmitted from the voice recognition server 30.

Regarding the switching to the voice operation display screen, the image forming apparatus 50 switches the display screen from the standby screen to the voice operation screen, based on the screen information stored in the image forming apparatus 50, in response to the instruction from the interactive server 60 for switching the operation screen.

Operation Processing by Voice Operation in Image Forming System

Next, in an image forming system 5 according to the fifth embodiment, operation processing when a user operates the image forming apparatus 50 by a voice instruction will be described with reference to the drawings.

Figure 21:
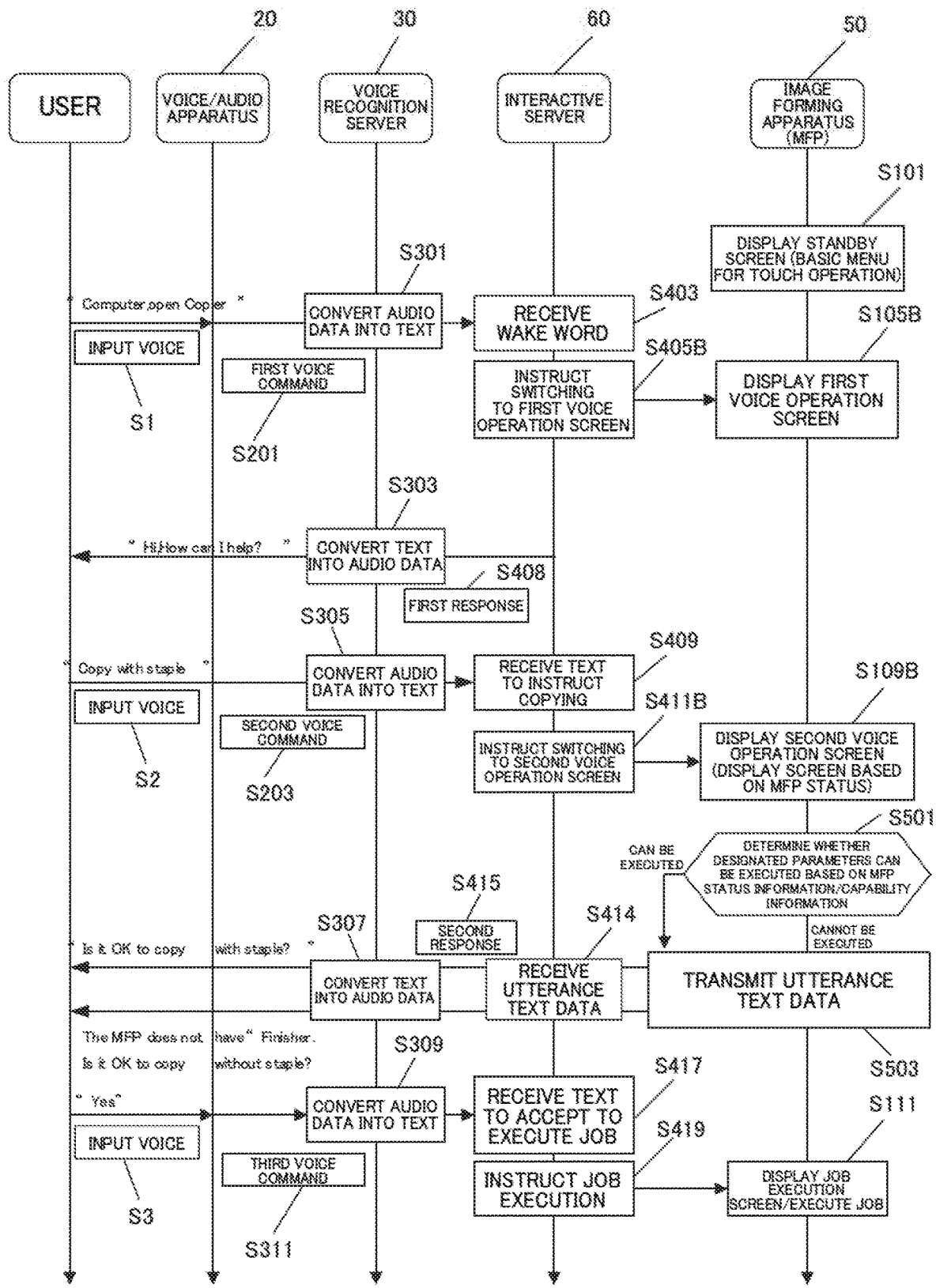
FIG. 21 is a sequence chart illustrating operation processing when a voice instruction is issued in the image forming system.

FIG. 21 is a sequence chart illustrating operation processing when a voice instruction is issued in the image forming system according to the fifth embodiment.

The operation processing in the image forming system 5 according to the fifth embodiment is substantially the same as the operation processing in the image forming system 1 according to the first embodiment. For convenience of description, operation processing different from that of the image forming system 1 according to the first embodiment will be described.

In the image forming system 5, when a user operates the image forming apparatus 50 by a voice instruction, the user first instructs the voice/audio apparatus 20 to start an operation by voice, as illustrated in FIG. 21 (81). The voice/audio apparatus 20 transmits the input voice to the voice recognition server 30 as a first voice command (S201).

The voice recognition server 30 converts, in the voice recognizer 380, audio data of the first voice command into text data. Further, the voice recognition server 30 recognizes a "Wake word" for starting a voice operation and transmits the "Wake word" to the interactive server 60 (S301).

Upon receiving the "Wake word" transmitted from the voice recognition server 30 (S403), the interactive server 60 instructs the image forming apparatus 50 to switch the standby screen to the first voice operation screen 152 for performing a voice operation (S405b). Upon receiving an instruction to switch the standby screen from the interactive server 60, the image forming apparatus 50 generates and displays the first voice operation screen, based on the first voice operation screen information 5611 (S105b).

As described above, in the fifth embodiment, the image forming apparatus 50 stores the first voice operation screen information 5611. Therefore, the image forming apparatus 50 can display a voice operation screen according to the capability of each MFP by self-determination. As a result, the interactive server 60 and the image forming apparatus 50 do not need to synchronize the MFP capability information therebetween. Further, the interactive server 60 does not need to transmit the first voice operation screen information to the image forming apparatus 50.

Upon receiving an instruction to switch the standby screen to the first voice operation screen 152 from the interactive server 60, the image forming apparatus 50 reads out the first voice operation screen information 5611 to generate the first voice operation screen 152 in the voice operation mode. Then, the image forming apparatus 50 switches the standby screen in the touch operation mode (the touch operation basic menu screen 151) to the first voice operation screen 152 in the voice operation mode to display the first voice operation screen 152 on the display 150 (S105*b*).

If the interactive server 60 instructs the image forming apparatus 50 to switch the first voice operation screen 152 to the second voice operation screen 153 for issuing a job setting instruction by a voice operation (8411*b*), the image forming apparatus 50 switches the first voice operation screen 152 to the second voice operation screen 153 to display the second voice operation screen 153 on the display 150 (S109*b*).

In the fifth embodiment, the image forming apparatus 50 stores the second voice operation screen information 5612. Therefore, the image forming apparatus 50 can display a voice operation screen according to the capability of each MFP by self-determination. Therefore, the interactive server 60 and the image forming apparatus 50 do not need to synchronize the MFP capability information therebetween. Further, the interactive server 60 does not need to transmit the second voice operation screen information to the image forming apparatus 50.

Then, in the fifth embodiment, the image forming apparatus 50 determines whether it is possible to execute the designated parameter, based on the MFP status information/capability information (8501).

If it is determined in 8501 that the execution of the parameter is possible, the image forming apparatus 50 transmits, to the interactive server 60, utterance text data indicating "Is it OK to copy with staple?" (8503). Upon receiving the utterance text data, the interactive server 60 transmits the text data to the voice recognition server 30 (S414).

On the other hand, if it is determined in 8501 that the execution of the parameter is not possible, the image forming apparatus 50 transmits, to the interactive server 60, utterance text data indicating "The MFP does not have 'Finisher'. Is it OK to copy without staple?" (8603). Upon receiving the utterance text data, the interactive server 60 transmits the text data to the voice recognition server 30 (S414).

Thereafter, similarly to the case in the image forming system 1 of the first embodiment, operation processing by a voice operation is performed.

With the above-described configuration, according to the fifth embodiment, it is not necessary to synchronize the MFP capability information between the interactive server 60 and the image forming apparatus (MFP) 50. Further, the interactive server 60 does not need to transmit, to the image forming apparatus 50, the first voice operation screen information 5611, the second voice operation screen information 5612, and the job execution screen information 5613. As a result, the image forming system 5 can improve the speed of communication processing for a voice response to a user, and thus, a time lag for the voice response to the user can be reduced, and more natural voice interaction can be achieved.

As described above, the present invention is not limited to the above-described examples and embodiments, and various modifications can be made without departing from the scope of the claims. It is obvious that those skilled in the art can conceive variations or modifications included in the claims. In other words, the technical scope of the present invention includes embodiments implemented as combinations of technical means modified as appropriate without departing from the spirit of the present invention.

DESCRIPTION OF REFERENCE NUMERALS

1 Image forming system
10 Image forming apparatus
20 Voice/audio apparatus
30 Voice recognition server
40 Interactive server
150 Display
151 Touch operation basic menu screen
152 First voice operation screen
153 Second voice operation screen
154 Job execution screen
210 Voice inputter

What is claimed is:

1. An image forming apparatus comprising a controller, a display, and an image former, and being capable of executing a processing function by a voice operation, wherein the controller performs controls to:
  be capable of displaying, on the display, a touch operation screen including an item capable of being used by a touch operation, and a voice operation screen used by the voice operation;
  switch the touch operation screen to the voice operation screen on the basis of a command to start an operation by voice being input through the voice operation; and
  execute a processing function in the image former on the basis of a command being input by voice through the voice operation, the voice operation screen including no item used only by the touch operation.

2. The image forming apparatus according to claim 1, wherein the controller performs controls to:
  display, if a first command is input by voice, a first voice operation screen displaying an executable processing function;
  display, if a second command for the processing function is input by voice, a second voice operation screen for changing on the basis of the second command, a setting item for the processing function; and
  execute the processing function in the image former on the basis of the setting item.

3. The image forming apparatus according to claim 1, wherein the controller, as the voice operation screen, displays only an item receiving a voice operation.

4. The image forming apparatus according to claim 1, wherein the controller, as the voice operation screen, displays text information used for utterance.

5. The image forming apparatus according to claim 1, wherein if a voice command is not received immediately after activation of the image forming apparatus or within a predetermined time while the voice operation screen is displayed, the controller displays a standby screen for receiving the touch operation on the display.

6. A method of forming an image by an image forming apparatus which includes a controller, a display, and an image former and is capable of executing a processing function by a voice operation, the method comprising:

displaying, on the display, a touch operation screen including an item capable of being used by a touch operation, and a voice operation screen used by the voice operation;

switching the touch operation screen to the voice operation screen on the basis of a command being input by voice through the voice operation; and executing a processing function in the image former on the basis of a command being input by voice through the voice operation, wherein the voice operation screen includes no item used only by the touch operation.

7. A non-transitory computer-readable recording medium storing a program of an image forming apparatus which includes a controller, a display, and an image former and is capable of executing a processing function by a voice operation, the program causing a computer to implement:

displaying, on the display, a touch operation screen including an item capable of being used by a touch operation, and a voice operation screen used by the voice operation;

switching the touch operation screen to the voice operation screen on the basis of a command to start an operation by voice being input through the voice operation; and executing a processing function in the image former on the basis of a command being input by voice through the voice operation, wherein the voice operation screen includes no item used only by the touch operation.

8. The image forming apparatus according to claim 1, wherein the voice operation screen includes at least a command.

9. The method of forming an image according to claim 6, wherein the voice operation screen includes at least a command.

10. The non-transitory computer-readable recording medium according to claim 7, wherein the voice operation screen includes at least a command.

* * * * *